United States Patent
Carter et al.

(10) Patent No.: US 7,427,150 B2
(45) Date of Patent: Sep. 23, 2008

(54) REARVIEW MIRROR ASSEMBLY INCLUDING A MULTI-FUNCTIONAL LIGHT MODULE

(75) Inventors: John W. Carter, Holland, MI (US); Darin D. Tuttle, Byron Center, MI (US); Bradley L. Busscher, Grand Rapids, MI (US); Frederick T. Bauer, Holland, MI (US); Garth D. Deur, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 736 days.

(21) Appl. No.: 10/660,834

(22) Filed: Sep. 12, 2003

(65) Prior Publication Data

US 2004/0114384 A1    Jun. 17, 2004

Related U.S. Application Data

(63) Continuation-in-part of application No. 10/228,525, filed on Aug. 27, 2002, now Pat. No. 7,342,707, which is a continuation of application No. 09/425,792, filed on Oct. 22, 1999, now Pat. No. 6,441,943, which is a continuation-in-part of application No. 09/311,955, filed on May 14, 1999, now Pat. No. 6,356,376.

(60) Provisional application No. 60/410,088, filed on Sep. 12, 2002.

(51) Int. Cl.
*G02F 1/153* (2006.01)
*G02B 5/12* (2006.01)
*G02B 5/136* (2006.01)
*B60Q 1/26* (2006.01)
*B60R 1/12* (2006.01)
*F21S 8/10* (2006.01)
*F21V 21/00* (2006.01)

(52) U.S. Cl. .............. 362/494; 359/515; 359/548; 362/545

(58) Field of Classification Search .............. 359/267, 359/273, 265, 515, 522, 547, 589, 839, 548; 362/494, 545
See application file for complete search history.

(56) References Cited

U.S. PATENT DOCUMENTS 1,849,708 A    3/1932    Colbert et al.

(Continued)

FOREIGN PATENT DOCUMENTS

EP    0 972 680 A2    1/2000

(Continued)

*Primary Examiner*—Ricky Mack
*Assistant Examiner*—Brandi N Thomas
(74) *Attorney, Agent, or Firm*—Price Heneveld Cooper DeWitt & Litton LLP

(57) ABSTRACT

An exterior rearview mirror assembly of the present invention, includes a lamp module with light sources functioning as a turn signal indicator, a security light, and a blind spot indicator. The light module may include at least one LED device that is activated during different activation modes so as to operate in two or more of the following modes: a blind spot indication mode, a turn signal mode, and a security light mode. The LED device may emit light of different color during the different modes of operation. The security light may be oriented to illuminate the door handle and keyhole. The light module may be positioned behind the mirror element to project light through the mirror element.

41 Claims, 10 Drawing Sheets

U.S. PATENT DOCUMENTS

| | | | |
|---|---|---|---|
| 2,166,303 A | 7/1939 | Hodny et al. | |
| 2,561,582 A | 7/1951 | Marbel | |
| 4,171,875 A | 10/1979 | Taylor et al. | |
| 4,274,078 A | 6/1981 | Isobe et al. | |
| 4,475,100 A | 10/1984 | Duh | |
| 4,641,136 A | 2/1987 | Kowalczyk | |
| 4,694,295 A | 9/1987 | Miller et al. | |
| 4,694,296 A | 9/1987 | Sasaki et al. | |
| 4,821,019 A | 4/1989 | Taylor | |
| 4,882,565 A | 11/1989 | Gallmeyer | |
| 4,906,085 A * | 3/1990 | Sugihara et al. | 359/839 |
| 4,943,796 A | 7/1990 | Lee | |
| 5,016,996 A | 5/1991 | Ueno | |
| 5,303,130 A | 4/1994 | Wei et al. | |
| 5,313,335 A | 5/1994 | Gray et al. | |
| 5,373,482 A | 12/1994 | Gauthier | |
| 5,634,709 A | 6/1997 | Iwama | |
| 5,668,675 A | 9/1997 | Fredricks | |
| 5,786,772 A * | 7/1998 | Schofield et al. | 340/903 |
| 5,929,786 A | 7/1999 | Schofield et al. | |
| 6,049,271 A | 4/2000 | Chu | |
| D425,466 S | 5/2000 | Todd et al. | |
| 6,076,948 A | 6/2000 | Bukosky et al. | |
| 6,079,858 A * | 6/2000 | Hicks | 362/486 |
| D428,842 S | 8/2000 | Todd et al. | |
| 6,106,121 A | 8/2000 | Buckley et al. | |
| 6,149,287 A | 11/2000 | Pastrick et al. | |
| 6,198,409 B1 | 3/2001 | Schofield et al. | |
| 6,257,746 B1 | 7/2001 | Todd et al. | |
| 6,264,353 B1 | 7/2001 | Caraher et al. | |
| 6,276,821 B1 * | 8/2001 | Pastrick et al. | 362/494 |
| 6,290,188 B1 * | 9/2001 | Bassett | 246/182 R |
| 6,441,943 B1 * | 8/2002 | Roberts et al. | 359/267 |
| 6,657,767 B2 | 12/2003 | Bonardi et al. | |

FOREIGN PATENT DOCUMENTS

| | | |
|---|---|---|
| GB | 2 222 991 A | 3/1990 |
| WO | WO 82/02448 | 7/1982 |

* cited by examiner

REARVIEW MIRROR ASSEMBLY INCLUDING A MULTI-FUNCTIONAL LIGHT MODULE

CROSS-REFERENCE TO RELATED APPLICATIONS

This application is a continuation-in-part of U.S. patent application Ser. No. 10/228,525, entitled "INDICATORS AND ILLUMINATORS USING A SEMICONDUCTOR RADIATION EMITTER PACKAGE," filed on Aug. 27, 2002, U.S. Pat. No. 7,342,707 by John K. Roberts et al., which is a continuation of U.S. patent application Ser. No. 09/425,792, entitled "INDICATORS AND ILLUMINATORS USING A SEMICONDUCTOR RADIATION EMITTER PACKAGE," filed on Oct. 22, 1999, by John K. Roberts et al., now U.S. Pat. No. 6,441,943, which is a continuation-in-part of U.S. patent application Ser. No. 09/311,955, entitled "ELECTROCHROMIC REARVIEW MIRROR INCORPORATING A THIRD SURFACE METAL REFLECTOR AND A DISPLAY/SIGNAL LIGHT," filed on May 14, 1999, by William L. Tonar et al., now U.S. Pat. No. 6,356,376, the entire disclosures of these applications are incorporated herein by reference.

This application claims priority under 35 U.S.C. §119(e) on U.S. Provisional Patent Application No. 60/410,088 entitled "REARVIEW MIRROR ASSEMBLY INCLUDING A BLIND SPOT/ILLUMINATING LIGHT," filed Sep. 12, 2002, by John W. Carter et al., the entire disclosure of which is incorporated herein by reference.

BACKGROUND OF THE INVENTION

The present invention generally relates to rearview mirror assemblies for vehicles, and more particularly to exterior rearview mirror assemblies incorporating light modules.

Light modules have been incorporated in vehicle rearview mirror assemblies for various purposes. For example, map lamps and indicator lights have been incorporated in interior rearview mirror assemblies. In exterior rearview mirror assemblies, it has become common to provide a turn signal light module on either the housing of the mirror assembly or behind the mirror element itself. When positioned behind the mirror element, the light from the light module is projected through either a transparent window that is formed in front of the lights of the light module or through a partially transmissive, partially reflective (i.e., "transflective") layer of the mirror element. When mounting such a turn signal light module on the rear of a mirror element, it is important to ensure that the light module is not too heavy so as to significantly increase the effect of vehicle vibration on the mirror element, and hence the image viewable from the mirror element. Additionally, one need be careful about etching away too much of the reflective surface area of the mirror so as to not significantly reduce the area of the viewable image reflected from the mirror and possibly reduce the dimming capacity of the mirror in at least that region.

Turn signal indicators provided in exterior rearview mirror assemblies have typically included a plurality of LED devices that all blink together in unison. When providing a number of different light sources in a mirror assembly for various functions, it is possible that a driver could confuse the turn signal light for some other light or vice versa. Thus, a more distinctive method of indicating a turn would be desirable.

Exterior rearview mirrors are also known which incorporate a "puddle light" lamp module in the housing of the exterior rearview mirror assembly. Such puddle lights direct light downward from the bottom portion of the mirror housing onto an area of the ground near the front doors of the vehicle. Heretofore, such puddle light lamp modules have been mounted to the housing of the exterior rearview mirror assembly, often along with an additional turn signal lamp assembly, which significantly increases the size of the housing without resulting in a corresponding increase in the size of the rearview mirror element. Such a large exterior rearview mirror housing raises not only styling concerns, but also concerns pertaining to aerodynamics and wind noise.

In addition to the above, it has been proposed to add blind spot indicator lights to outside rearview mirror assemblies. Examples of which are disclosed in U.S. Pat. Nos. 5,313,335, 5,786,772, and 5,929,786. With it becoming more popular to incorporate "puddle lights" and turn signals into outside mirror assemblies, adding an additional light module for blind spot indication adds to the complexity, size, and weight of the mirror assembly. In addition, either additional wiring must be run to the mirror subassembly to support this function, or the blind spot detection sensors and control circuitry must also be provided in the mirror assembly.

SUMMARY OF THE INVENTION

According to one embodiment of the present invention, a rearview mirror assembly for a vehicle comprises: a housing configured for attachment to the vehicle; a mirror positioned in the housing; a turn signal light source; and a door illuminator light source configured to project light towards the door handle and/or locking mechanism of the vehicle.

According to another embodiment of the present invention, a light module for a vehicle rearview mirror assembly is provided where the light module comprises: a turn signal light source and a door illuminator light source configured to project light at a portion of a door of the vehicle.

According to another embodiment of the present invention, a light module for a vehicle rearview mirror assembly is provided where the light module comprises: a blind spot indicator for indicating when an object is detected in a blind spot of the vehicle; and a door illuminator configured to project light at a portion of a door of the vehicle.

According to another embodiment of the present invention, a rearview mirror assembly for a vehicle comprises: a housing configured for attachment to the vehicle; a mirror positioned in the housing; a turn signal light; a door illuminator light configured to project light at a portion of a door of the vehicle; and a blind spot indicator light for indicating when an object is detected in a blind spot of the vehicle.

According to another embodiment of the present invention, a light module for a vehicle rearview mirror assembly is provided where the light module comprises: a turn signal light and a blind spot indicator light for indicating when an object is detected in a blind spot of the vehicle.

According to another embodiment of the present invention, a mirror subassembly for a vehicle comprises: a mirror element; and a turn signal indicator mounted behind the mirror element, the turn signal indicator comprising a first light source, a second light source, and a third light source, wherein the first, second, and third light sources are sequentially activated.

According to another embodiment of the present invention, a rearview mirror assembly for a vehicle comprises: a mirror housing for mounting to the vehicle; a mirror element disposed in the mirror housing; and a turn signal indicator disposed in the mirror housing, the turn signal indicator comprising a first light source, a second light source, and a third light source, wherein the first, second, and third light sources are sequentially activated.

According to another embodiment of the present invention, an exterior rearview mirror assembly for a vehicle comprises: a mirror housing for mounting to the exterior of a vehicle; a mirror element disposed in the mirror housing; and a first light source disposed proximate the mirror element, the first light source being operable in a first lighting mode in response to a first activation signal, and in a second lighting mode in response to a second activation signal.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
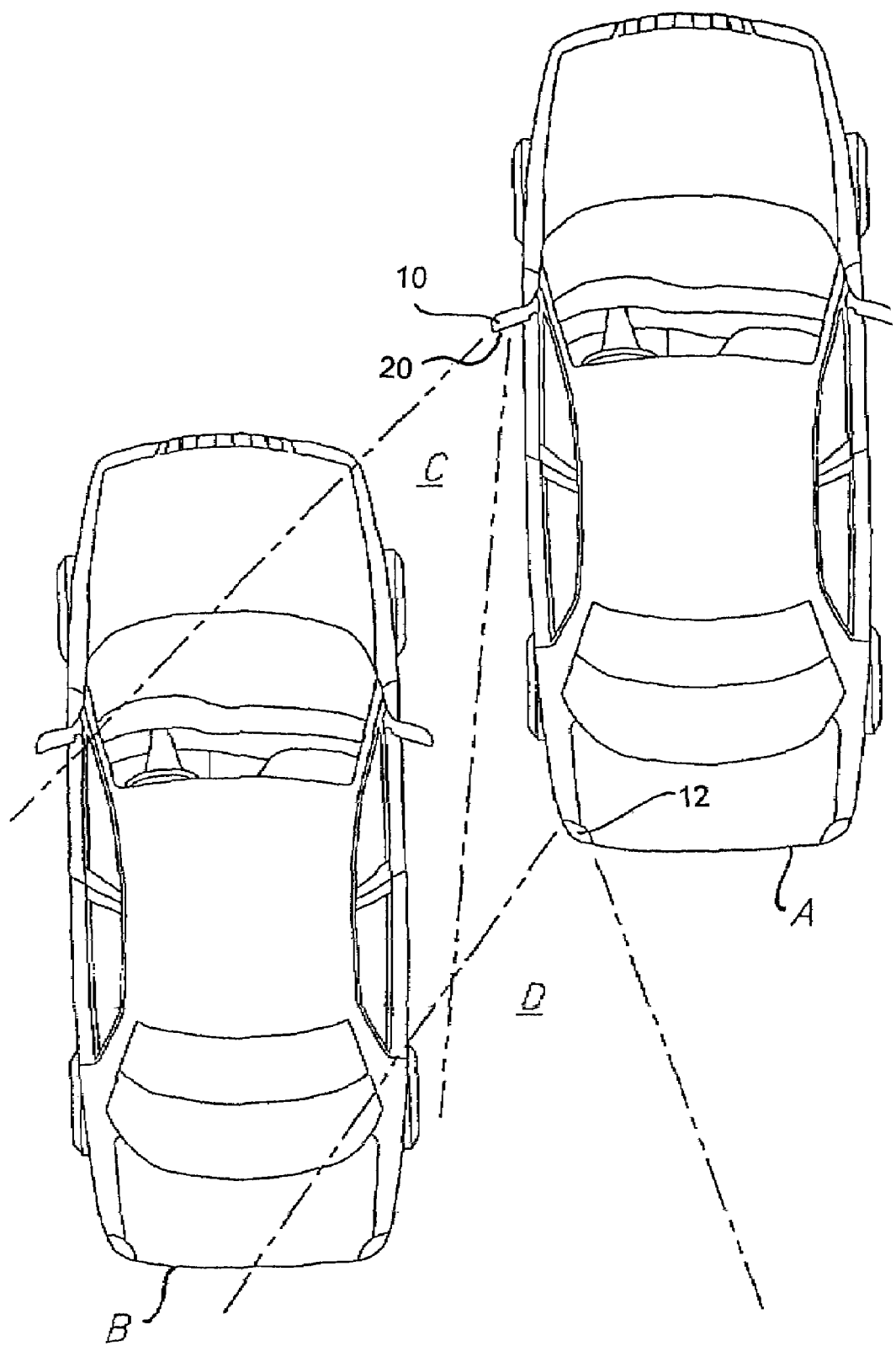
FIG. 1 illustrates two vehicles traveling in adjacent traffic lanes.

As shown in FIG. 1, a rearview mirror assembly 10 constructed in accordance with the present invention is mounted on a vehicle A. The rearview mirror assembly 10 includes an inventive lamp module 20 to generate a signal visible to an observer. An example of one significant advantage that can be achieved by such a signaling device is evident from FIG. 1, wherein the driver of another vehicle (B) is positioned in what is commonly referred to as the blind spot for the driver of vehicle A. Additionally, the driver of vehicle B is unlikely to see the rear turn signal lamp 12 being well outside of the optimum viewing area D for that signal lamp. A lamp module 20 that generates a signal discernable in viewing area C is therefore advantageous as the driver of vehicle B can be alerted to vehicle A's driver's intent to change lanes, and can take appropriate action to avoid an accident in response to the signal.

As will be described further below, lamp module 20 may also be used to function as a blind spot indicator light to warn the driver of objects detected in the blind spot of the vehicle. More specifically, the lamp module may provide visual indications of different colors to convey different information to the driver with respect to the status of the blind spot detection system. For example, the lamp module may provide a yellow or green indication to provide a positive indication that the blind spot detection system is operational, and also provide a red indication to warn of an object in the vehicle's blind spot. Because drivers typically look in their outside rearview mirrors when changing lanes, the rearview mirror assembly 10 provides an excellent location for a blind spot indicator. When combined with the turn indication signaling discussed above, the rearview mirror assembly 10 significantly decreases the likelihood of an accident with a vehicle in a blind spot by providing a warning to both drivers.

Figure 2:
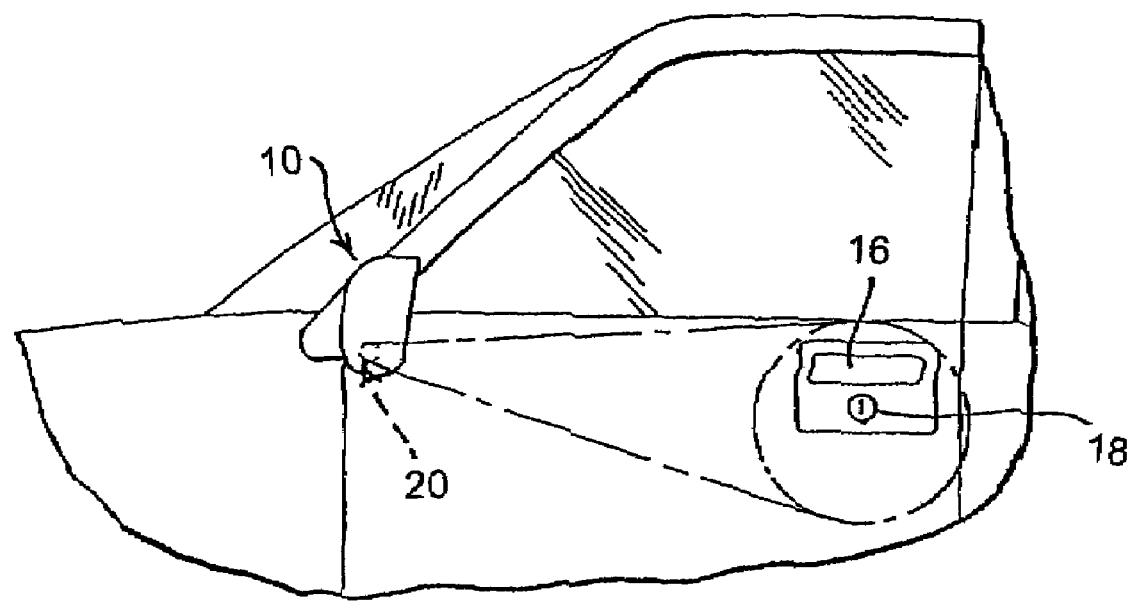
FIG. 2 is a fragmentary side view illustrating a vehicle having the inventive outside rearview mirror assembly.

FIG. 2 is a side view of rearview mirror 10 on vehicle A. As shown, the inventive lamp module 20 may also be used to illuminate a portion of a door of the vehicle. Preferably, lamp module 20 illuminates the handle 16 and/or lock mechanism 18 of the vehicle to make it easier to enter the vehicle at night.

Figure 3:
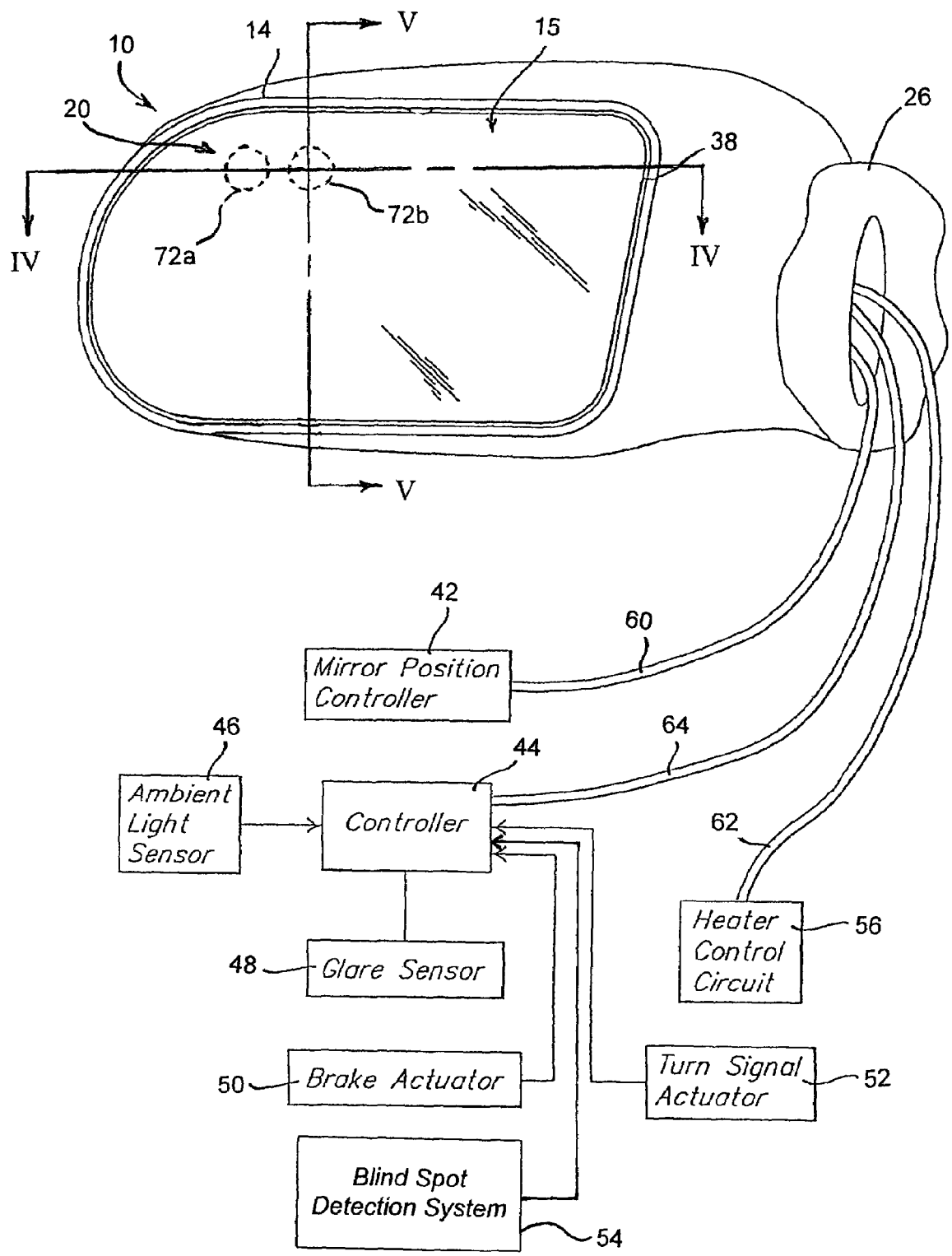
FIG. 3 is a schematic representation of the inventive rearview mirror assembly showing circuitry used therewith in block diagram form.
Figure 4:
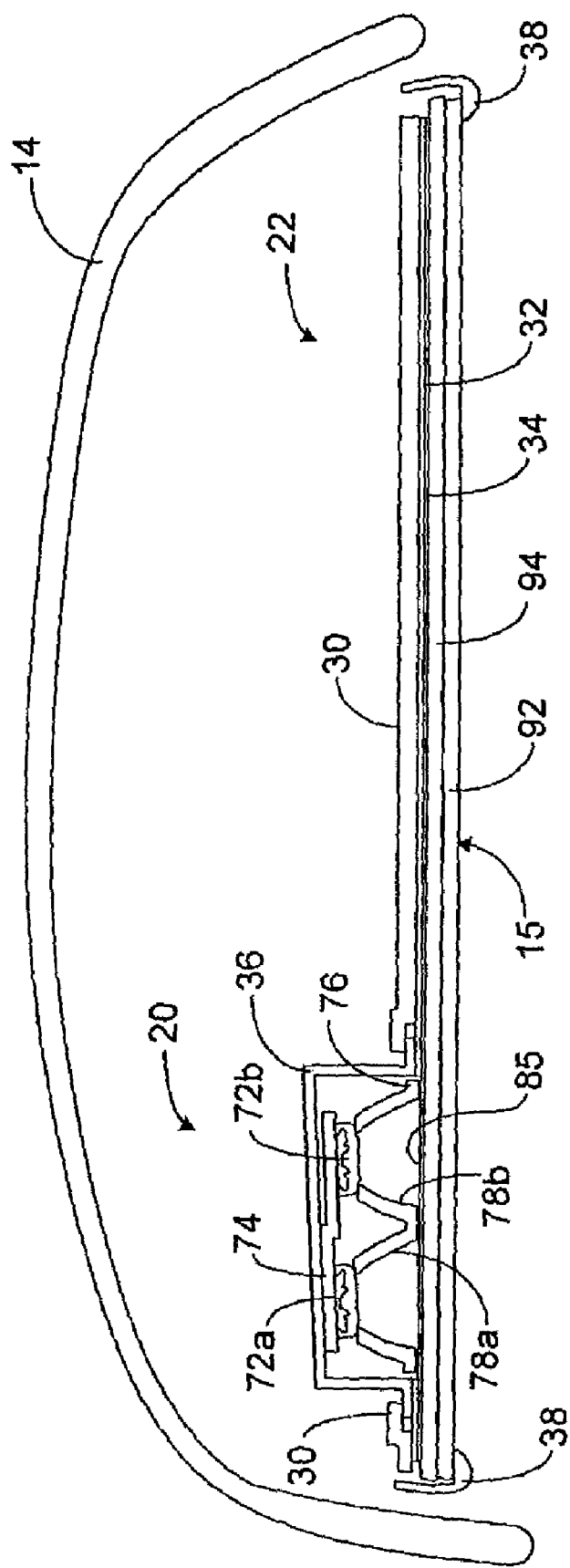
FIG. 4 is a cross-sectional view of the rearview mirror assembly shown in FIG. 3 taken along line IV-IV.
Figure 5:
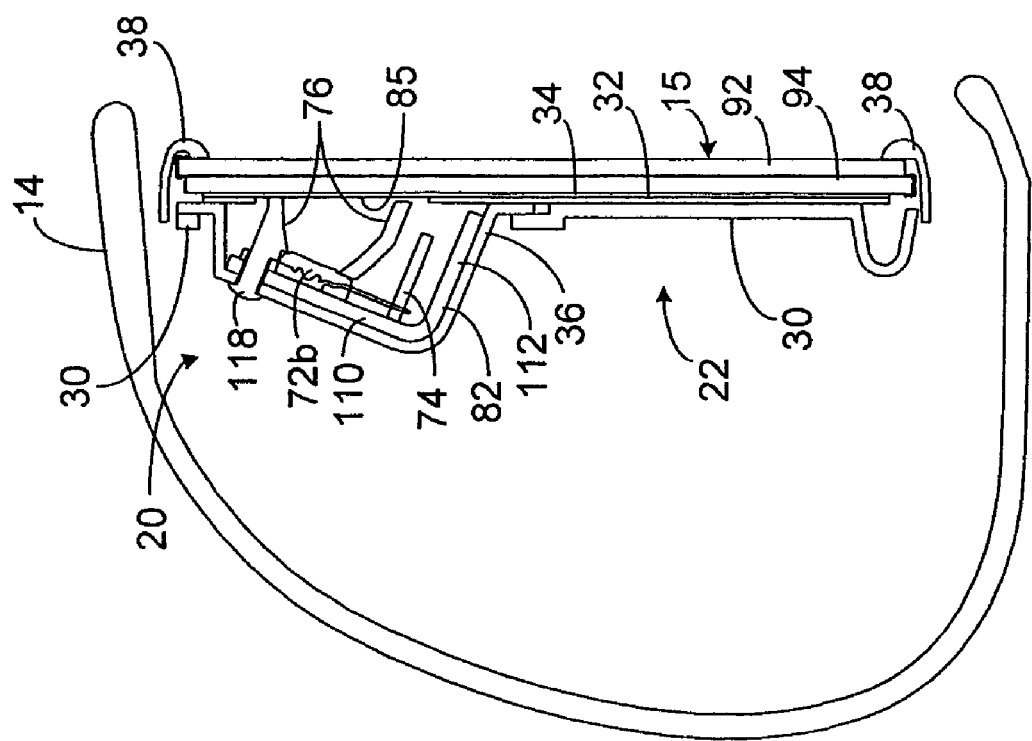
FIG. 5 is a cross-sectional view of the rearview mirror assembly shown in FIG. 3 taken along line V-V.

With reference to FIGS. 3-5, the mirror assembly 10 will now be generally described. The illustrated mirror assembly 10 includes: a rearview mirror body housing 14; a mirror 15; lamp module 20; a vehicle body mounting bracket 26 for securing the mirror assembly to the vehicle; a carrier 30 on which mirror 15 is supported; a foam pad 32; a heater 34; a lamp module housing 36; and a bezel 38. With reference to FIG. 3, the vehicle includes: a mirror position controller 42; a controller 44 coupled to receive inputs from an ambient light sensor 46, a glare sensor 48, a brake actuator 50, a turn signal actuator 52, and a blind spot detector system 54; and a heater control circuit 56. Blind spot detector system 54 may be any conventional system provided it is configured to deliver a signal that is comprehensible by a controller (44) or light emitting diode (LED) lamp module (20). Examples of blind spot detection systems are disclosed in U.S. Pat. Nos. 5,313,335, 5,786,772, 5,929,786, and 6,363,326 and in U.S. Patent Application Publication No. 2002/0041442 A1, the entire disclosures of which are incorporated herein by reference.

The lamp module 20 may further be used as a supplemental brake light when coupled to brake actuator 50. It will be recognized by those skilled in the art that although the illustrated rearview mirror assembly is outside of the vehicle adjacent the driver's seat, mirror assembly can be inside the vehicle or mounted at any location on the exterior of the vehicle, such as on the passenger-side front door, and it will be further recognized that the mirror assembly can include additional elements and functionality, or consist only of a mirror and lamp module.

Somewhat more particularly, the rearview mirror body housing 14 is typically an enclosure which is shaped taking into consideration the style of vehicle A (FIG. 1) to which it is attached as well as general aerodynamic principles, serving the primary functions of providing functional and aesthetic styling, and protecting the mirror components from flying objects, such as stones. The rearview mirror body housing 14 (FIG. 3) can be molded from a polymer, stamped from a metal or metal alloy, or of any other suitable conventional manufacture. The exterior of the rearview mirror body housing 14 is typically painted to match the color of vehicle A and covered with a clear coat finish.

The rearview mirror body housing 14 partially encloses a support bracket (not shown), which is attached to the vehicle A (FIG. 1) using mounting bracket 26 (FIG. 3). The support bracket and the mounting bracket 26 are constructed and attached through conventional means. Housing 14 may be connected to mounting bracket 26 via a telescoping extension that may comprise a single arm having a linear actuator for extending and retracting the telescoping extension from within the associated vehicle. The telescoping extension may comprise a rack and pinion type linear actuator, an electrical solenoid type linear actuator, a pneumatic piston or a hydraulic actuator. The housing 14 may be configured such that the housing axially pivots about the telescoping extension. Additionally, the telescoping extension may be configured such that the housing may be folded inward toward the associated vehicle and outward away from the associated vehicle. The attachment member is configured to be received by a vehicle mount. The vehicle mount may be fixed to a door panel, an A-pillar, a front fender, a window assembly, or any other position where a driver can view the scene generally rearward of the associated vehicle. It should be understood that the telescoping extension may comprise two or more arms and that the housing may be configured to pivot and fold irrespective of the number of arms employed. It should also be understood that the housing may be connected to a non-telescoping extension such that the housing pivots about the connection to allow the mirror to be positioned closer or farther from the vehicle as desired; this feature may be accompanied by a power positioning mechanism such that actuation may be performed inside the vehicle. It should be understood that the mirror housing, extension and attachment member may be configured such that the telescoping, pivoting and folding requires a manual operation.

A motor (not shown) may be mounted on the support bracket. The motor can be provided by any suitable conventional mechanism of the type commercially available to adjust the position of the mirror subassembly responsive to control signals received from a conventional mirror position controller 42 (FIG. 3). The control signals are input to the motor from the position control controller 42 via a cable 60. The control signals are typically generated using switches located in the door or center console of vehicle A, which switches are positioned to be accessible to the driver. Alternatively, the motor and mirror position controller can be replaced by a ball and socket support, which permits the mirror angle to be adjusted by manual manipulation.

Carrier 30, foam pad 32, optional heater 34, LED lamp module 20, lamp module housing 36, mirror 15, and bezel 38 together form a mirror subassembly 22. The carrier is preferably formed of a molded polymer, although it can be of any suitable conventional manufacture, such as stamped from a metal or metal alloy. The above-described mirror position motor may be mechanically connected to carrier 30 for providing a secure structure for supporting and moving of the associated reflective element 15. Examples of suitable carriers are described in U.S. Pat. Nos. 6,195,194 and 6,239,899 and in U.S. Patent Application Publication No. 2002/0171906 A1, the disclosures of which are incorporated herein in their entireties by reference.

Foam 32 may be a double sided adhesive foam that is employed to attach the reflective element to the carrier. In certain instances, apertures may be provided in the double sided adhesive foam for accommodating positioning of various components.

Heater 34 improves the operation of the device and melts frozen precipitation that may be present. Examples of various heaters are disclosed in U.S. Pat. Nos. 5,151,824, 6,244,716, 6,426,485, 6,441,943 and 6,356,376, and in U.S. Patent Application Publication Nos. 2002/0171906 A1 and 2002/0171954 A1, the disclosures of each of these patents are incorporated in their entireties herein by reference.

A mirror circuit board (not shown) is optional, and can be omitted, for example, where the mirror assembly 10 does not include a significant amount of circuitry. If included, the mirror circuit board can be either a flexible circuit board or a rigid circuit board. The mirror circuit board can have one or more integrated circuit (IC) components mounted thereto by conventional means, such as surface mounted, or mounted to through-holes, also known as vias, using soldering or other techniques, and is preferably a thin printed circuit board to reduce the thickness and weight of the mirror subassembly 22. A mirror subassembly including a flexible circuit board is disclosed in commonly-assigned U.S. Pat. No. 6,244,716, which is incorporated herein by reference in its entirety.

The optional heater 34 can be of any suitable construction. More particularly, the heater 34 can be a resistive conductor having an adhesive on one surface, or opposite surfaces thereof. The resistive conductor generates heat when a current is applied thereto. The resistive conductor implementation of heater 34 can be applied to the back surface of mirror 15, applied to two-sided tape, mounted on an optional mirror printed circuit board, or etched in a conductive surface of the mirror circuit board. An example of such a circuit board incorporating a heater circuit is disclosed in commonly assigned U.S. patent application Ser. No. 10/105,574 entitled "REARVIEW MIRROR ASSEMBLY CONSTRUCTION," filed on Mar. 25, 2002, by Timothy A. Bonardi et al., the entire disclosure of which is incorporated herein by reference. Heater 34 is electrically coupled to heater control circuit 54 via a cable 62 for selective activation.

Mirror 15 can be flat, aspheric, or convex. Mirror 15 can be a prismatic (non-electrochromic), single element mirror having a reflector on the first or second surface. Such mirrors are often constructed of a transparent element, such as glass or a polymeric material, with a reflective coating such as chrome, silver, or the like serving as the reflector. Alternatively, mirror 15 can be an electrochromic mirror, which offers the significant advantage of being able to automatically adjust its reflectivity to reduce glare at night and to provide a high level of reflectivity during the day, when glare is not a significant problem. Electrochromic mirrors amplify the difficulty of providing a signal mirror as the LED device has to transmit through two pieces of glass, at least one transparent conductive material, and an electrochromic medium, in addition to the reflector or dichroic coatings. Electrochromic devices are generally known, and examples of electrochromic devices and associated circuitry, some of which are commercially available, are disclosed in Byker U.S. Pat. No. 4,902,108; Bechtel et al. Canadian Patent No. 1,300,945; Bechtel U.S. Pat. No. 5,204,778; Byker U.S. Pat. No. 5,280,380; Byker U.S. Pat. No. 5,336,448; Bauer et al. U.S. Pat. No. 5,434,407; Tonar U.S. Pat. No. 5,448,397; Knapp U.S. Pat. No. 5,504,478; Tonar et al. U.S. Pat. No. 5,679,283, Tonar et al. U.S. Pat. No. 5,682,267; Tonar et al. U.S. Pat. No. 5,689,370; Tonar et al. U.S. Pat. No. 5,888,431; and Bechtel et al. U.S. Pat. No. 5,451,822. Each of these patents is commonly assigned with the present invention and the disclosures of each are hereby incorporated herein by reference in their entirety. Such electrochromic devices may be utilized in a filly integrated inside/outside rearview mirror system or as separate inside or outside rearview mirror systems. Alternatively, the mirror can be a dichroic mirror.

Regardless of the type of mirror 15, the bezel 38 is typically dimensioned to fit over and circumscribe the perimeter edge of the mirror 15. The bezel can be of any suitable construction, such as molded of an organic polymer, stamped from a metal or metal alloy, or the like. When assembled to carrier 30, bezel 38 together with carrier 30 support, frame, and protect the mirror 15, as well as the components associated therewith.

For clarity of description of such an electrochromic mirror structure, the front surface of the front glass substrate 92 is sometimes referred to as the first surface, and the inside surface of the front glass substrate 92 is sometimes referred to as the second surface. The inside surface of the rear glass substrate 94 is sometimes referred to as the third surface, and the back surface of the rear glass substrate 94 is sometimes referred to as the fourth surface.

There are two general types of electrochromic mirror element constructions, those with either a third or fourth surface reflector. The structure of the third surface reflector can have a wide variety of structures depending on the specific characteristics desired both for the electrochromic mirror as a whole and the mirror subassembly.

The first substrate 92 and second substrate 94 of the variable reflectance mirror element 15 are secured in a spaced apart relationship by a seal to define a chamber therebetween. The reflective element may be configured to define a convex element, an aspheric element, a planar element, a non-planar element, a wide field of view element, or a combination of these various configurations in different areas to define a complex mirror element shape. The first surface of the first substrate 92 may comprise a hydrophilic or hydrophobic coating to improve the operation as disclosed in commonly-assigned U.S. Pat. No. 6,193,378, the entire disclosure of which is incorporated herein by reference. The reflective element may comprise an anti-scratch layer, or layers, on the exposed surfaces of the first and, or, second substrates. The reflective element may comprise area(s) that are devoid of reflective material, such as etched in bars or words, to define information display area(s). Examples of various reflective elements are described in U.S. Pat. Nos. 5,682,267, 5,689,370, 6,064,509, 6,062,920, 6,268,950, 6,195,194, 5,940,201, 6,246,507, 6,057,956, 6,512,624, 6,356,376, 6,166,848, 6,111,684, 6,193,378, 6,239,898, 6,441,943, 6,037,471, 6,020,987, 5,825,527, and 5,998,617, the disclosures of each of these patents are incorporated in their entireties herein by reference.

Preferably the chamber contains an electrochromic medium. Electrochromic medium is preferably capable of selectively attenuating light traveling therethrough and preferably has at least one solution-phase electrochromic material and preferably at least one additional electroactive material that may be solution-phase, surface-confined, or one that plates out onto a surface. However, the presently preferred media are solution-phase redox electrochromics, such as those disclosed in commonly assigned U.S. Pat. Nos. 4,902,108, 5,128,799, 5,278,693, 5,280,380, 5,282,077, 5,294,376, 5,336,448, 5,808,778, and 6,020,987; the entire disclosures of which are incorporated herein in their entireties by reference. If a solution-phase electrochromic medium is utilized, it may be inserted into the chamber through a sealable fill port through well-known techniques, such as vacuum back-filling and the like.

Electrochromic medium preferably includes electrochromic anodic and cathodic materials that can be grouped into the following categories:

(i) Single layer—the electrochromic medium is a single layer of material which may include small inhomogeneous regions and includes solution-phase devices where a material is contained in solution in the ionically conducting electrolyte and remains in solution in the electrolyte when electrochemically oxidized or reduced. U.S. Pat. No. 6,193,912 entitled "NEAR INFRARED-ABSORBING ELECTROCHROMIC COMPOUNDS AND DEVICES COMPRISING SAME"; U.S. Pat. No. 6,188,505 entitled "COLOR STABILIZED ELECTROCHROMIC DEVICES"; U.S. Pat. No. 6,262,832 entitled "ANODIC ELECTROCHROMIC MATERIAL HAVING A SOLUBLIZING MOIETY"; U.S. Pat. No. 6,137,620 entitled "ELECTROCHROMIC MEDIA WITH CONCENTRATION ENHANCED STABILITY PROCESS FOR PREPARATION THEREOF AND USE IN ELECTROCHROMIC DEVICE"; U.S. Pat. No. 6,195,192 entitled "ELECTROCHROMIC MATERIALS WITH ENHANCED ULTRAVIOLET STABILITY"; U.S. Pat. No. 6,392,783 entitled "SUBSTITUTED METALLOCENES FOR USE AS AN ANODIC ELECTROCHROMIC MATERIAL AND ELECTROCHROMIC MEDIA AND DEVICES COMPRISING SAME"; and U.S. Pat. No. 6,249,369 entitled "COUPLED ELECTROCHROMIC COMPOUNDS WITH PHOTOSTABLE DICATION OXIDATION STATES" disclose anodic and cathodic materials that may be used in a single layer electrochromic medium, the entire disclosures of which are incorporated herein by reference. Solution-phase electroactive materials may be contained in the continuous solution phase of a cross-linked polymer matrix in accordance with the teachings of U.S. Pat. No. 5,928,572, entitled "IMPROVED ELECTROCHROMIC LAYER AND DEVICES COMPRISING SAME" or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

At least three electroactive materials, at least two of which are electrochromic, can be combined to give a pre-selected color as described in U.S. Pat. No. 6,020,987 entitled "ELECTROCHROMIC MEDIUM CAPABLE OF PRODUCING A PRE-SELECTED COLOR," the entire disclosure of which is incorporated herein by reference. This ability to select the color of the electrochromic medium is particularly advantageous when designing information displays with associated elements.

The anodic and cathodic materials can be combined or linked by a bridging unit as described in International Application No. PCT/WO97/EP498 entitled "ELECTROCHROMIC SYSTEM," the entire disclosure of which is incorporated herein by reference. It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as described in International Application No. PCT/WO98/EP3862 entitled "ELECTROCHROMIC POLYMER SYSTEM," U.S. Pat. No. 6,002,511, or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

Also included is a medium where one or more materials in the medium undergoes a change in phase during the operation of the device, for example, a deposition system where a material contained in solution in the ionically conducting electrolyte which forms a layer, or partial layer on the electronically conducting electrode when electrochemically oxidized or reduced.

Multilayer—the medium is made up in layers and includes at least one material attached directly to an electronically conducting electrode or confined in close proximity thereto which remains attached or confined when electrochemically oxidized or reduced. Examples of this type of electrochromic medium are the metal oxide films, such as tungsten oxide, iridium oxide, nickel oxide, and vanadium oxide. A medium, which contains one or more organic electrochromic layers, such as polythiophene, polyaniline, or polypyrrole attached to the electrode, would also be considered a multilayer medium.

In addition, the electrochromic medium may also contain other materials, such as light absorbers, light stabilizers, thermal stabilizers, antioxidants, thickeners, or viscosity modifiers.

It may be desirable to incorporate a gel into the electrochromic device as disclosed in commonly assigned U.S. Pat. No. 5,940,201 entitled "ELECTROCHROMIC MIRROR WITH TWO THIN GLASS ELEMENTS AND A GELLED ELECTROCHROMIC MEDIUM," filed on Apr. 2, 1997. The entire disclosure of this U.S. patent is incorporated herein by reference.

In at least one embodiment, a rearview mirror assembly is provided with an electro-optic element having a substantially transparent seal. Examples of substantially transparent seals and methods of forming substantially transparent seals are provided in U.S. Pat. No. 5,790,298, the entire disclosure of which is included herein by reference.

In at least one embodiment, the rearview mirror assembly is provided with a bezel 38 for protecting the associated seal from damaging light rays and to provide an aesthetically pleasing appearance. Examples of various bezels or substitutes for bezels are disclosed in U.S. Pat. Nos. 5,448,397, 6,102,546, 6,195,194, 5,923,457, 6,239,898, 6,170,956 and 6,471,362, in U.S. patent application Ser. No. 10/260,741, and in U.S. Patent Application Publication No. 20030103257 A1, the disclosures of which are incorporated herein in their entireties by reference.

Controller 44 controls the reflectance of the electrochromic mirror 15, and optionally provides control signals to control LED lamp module 20 via a cable 64. The controller 44 can advantageously be implemented using one or more microcontrollers and associated circuitry, and may for example be an interior rearview mirror controller of the type associated with an electrochromic rearview mirror commonly mounted to the vehicle windshield, and the external mirror can receive control signals from such a controller. The controller 44 is coupled to an ambient light sensor 46, which typically faces forwardly of the vehicle, and a glare sensor 48, which typically faces rearwardly to sense the light coming from the rear of the vehicle. The controller 44 can generate control signals for both an interior electrochromic mirror and one or more exterior electrochromic mirrors 15. Examples of electrochromic mirror controllers are disclosed in: Canadian Patent No. 1,300,945, entitled "AUTOMATIC REARVIEW MIRROR SYSTEM FOR AUTOMOTIVE VEHICLES," issued May 19, 1992, to Jon H. Bechtel et al.; U.S. Pat. No. 5,956,012, entitled "SERIES DRIVE CIRCUIT," to Robert R. Turnbull et al., and PCT Application No. PCT/US97/16946, entitled "INDIVIDUAL MIRROR CONTROL SYSTEM," filed by Robert C. Knapp et al. on Sep. 16, 1997; and U.S. Pat. No. 6,402,328, the disclosures of which are incorporated by herein by reference.

Those skilled in the art will recognize that the electrical cable conductors 60-64 (FIG. 3) can be provided by conventional conductors, such as a vehicle bus and/or copper wires having individual insulated sleeves and bundled together in a wire harness (not shown) running from the vehicle through the mirror mounting structure. Such a wiring harness is provided to interface the exterior mirror with associated apparatus located inside the associated vehicle. The wiring harness may be configured to provide extension, folding and pivoting of the housing and may also be configured to provide reflective element control, electrical power, turn signal actuation, mirror heater control, mirror element positioning, light sensor interface, exterior mirror circuit board interface, blind spot detection, lane departure detection/warning, transceiver interface, information display interface, antenna interface, light source power and control, emergency flasher interface, and all other electrical features as described herein. It should be understood that operator interfaces are provided within the vehicle for each of these features where appropriate.

Rearview mirror assembly 10 is exemplified having a large number of components to illustrate the small volume that mirror designers have available for a signal lamp. It is desirable to provide a large number of components within the mirror for utility, safety and convenience reasons, even though a large volume is required to accommodate a large number of components. In particular: a motor permits driver adjustment of the mirror position for improved visibility without having to open the window and stretch to physically contact the mirror while operating the vehicle; the electrochromic mirror improves the drivers visibility by attenuating headlight glare from other vehicles at night and providing a substantially unattenuated reflection during daylight hours thereby improving rearward visibility; the heater 34 improves visibility through the rearview mirror by clearing the mirror of moisture such as ice and condensation; and the LED lamp module 20 performs multiple functions including: increasing the likelihood that drivers of other vehicles will be alerted by the signaling system of vehicle A, illuminating the door handle and lock mechanism for ease of entry during nighttime conditions, and providing convenient blind spot indications.

A substantial volume must also be provided in the mirror body housing 14 if the mirror is to have significant freedom of movement for adjusting the mirror angle to reflect the driver's desired field of vision. In direct conflict with this need for more volume in the mirror body housing is the desire to make mirror assemblies as small as possible. Two principle reasons for making the mirror as small as possible include improved aerodynamics, and reduced wind noise. Accordingly, there is a need to reduce the volume of mirror assembly 10 required by the components in the mirror assembly not only without reducing the features in the mirror assembly, but to increase the number of features.

Figure 6:
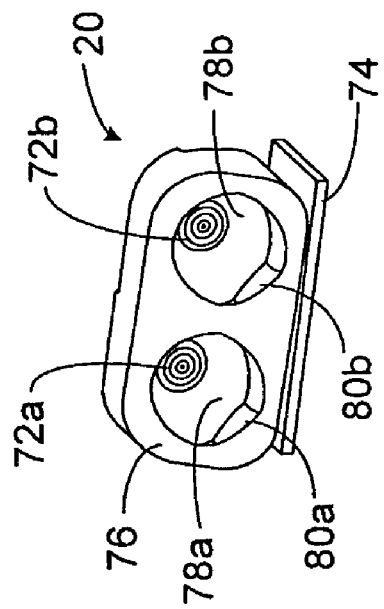
FIG. 6 is a front perspective view of a portion of lamp module 20 used in the rearview mirror assembly shown in FIGS. 3-5.

Lamp module 20 may have various forms. An exemplary integral lamp module construction is shown in FIGS. 4-6 and described further below. Specifically, lamp module 20, as shown in these drawing figures, includes a first LED device 72a and a second LED device 72b (collectively referred to as "LED devices 72"). In this particular embodiment, LED devices 72*a* and 72*b* are both preferably capable of emitting effective white light. Additionally, at least one of LED devices 72*a* and 72*b* is preferably capable of emitting green and/or yellow/amber light, while at least both or the other LED device are preferably capable of emitting red light. This particular light module 20 would thus be capable of functioning both as a blind spot indicator light and a door handle illuminator. Lamp module 20 further includes a circuit board 74 to which LED devices 72 are preferably electrically connected. Circuit board 74 may include an electrical connector for coupling to controller 44 or may include a connector for connecting to another printed circuit board or other multi-junction connector for subsequent connection to controller 44.

Lamp module 20 further includes a reflector 76, which may be formed of metal or plastic. If formed of metal, reflector 76 may serve as a heat sink for the LED devices. If formed of plastic, reflector 76 is preferably metallized so as to provide highly reflective reflector cups 78*a* and 78*b* for LED devices 72*a* and 72*b*, respectively. Preferably, reflector cups 78*a* and 78*b* are generally parabolic in shape. Reflector cup 78*a* and 78*b* may include flat facets 80*a* and 80*b* functioning as deviators for redirecting a portion of the light emitted from LED device 72 and reflect that light in the direction of the eyes of the driver so as to ensure that any light emitted for blind spot detection can be readily viewed by the driver. With both LED devices 72*a* and 72*b* intended to project generally white illumination towards the door handle and keyhole, the reflector cups 78*a* and 78*b* are preferably configured and mounted behind mirror 15 such that the majority of the light is narrowly focussed on this region. A diffuser 85 is preferably provided on the rear of mirror 15 to diffuse the light from LED devices 72. Heater 34 may function as such a diffuser.

Although the preferred implementation utilizes LED devices capable of emitting effective white light, it will be appreciated by those skilled in the art that any other color of light that is sufficiently bright may be utilized, such as amber or the like.

To produce white light, LED devices 72 are preferably constructed in the manner disclosed in commonly assigned U.S. patent application Ser. No. 09/723,675 entitled "LIGHT EMITTING ASSEMBLY," filed on Nov. 28, 2000, by John K. Roberts et al. The preferred implementation would be to utilize either a binary complementary pair of LED chips within each LED device 72 along with any additional LED chips that may be required for providing an appropriate warning indication (i.e., a red LED chip), or the use of red, green, and blue LED chips, which together would be capable of producing most any color desired.

Figure 7:
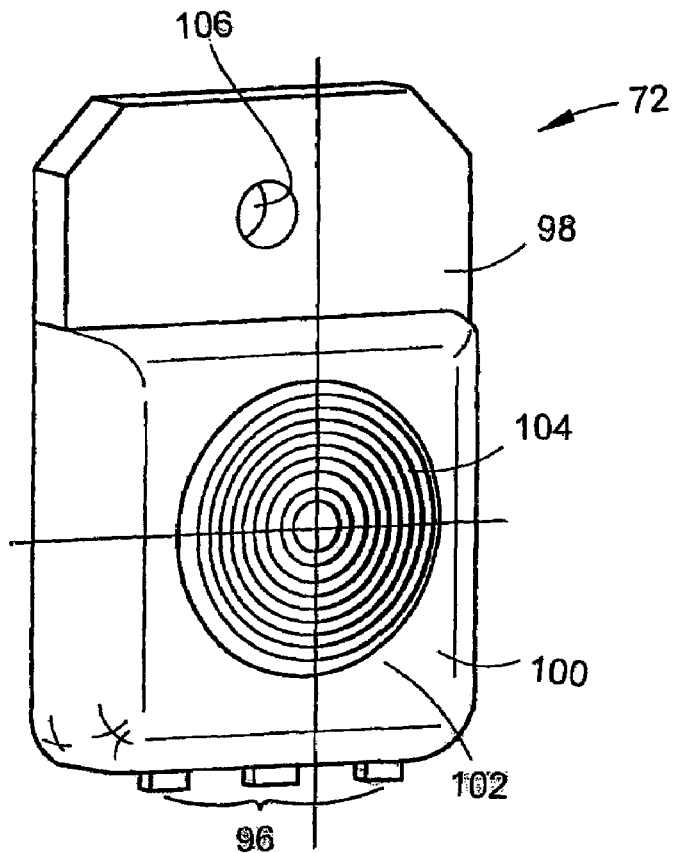
FIG. 7 is a front perspective view of an exemplary LED device that may be utilized in the lamp module 20 of the inventive rearview mirror assembly.
Figure 8:
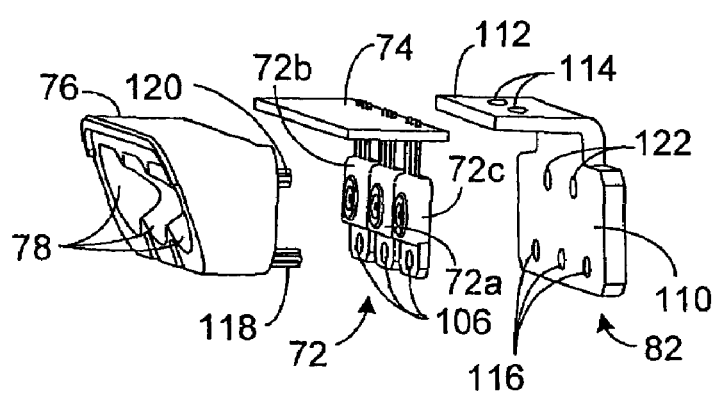
FIG. 8 is an exploded perspective view of a second construction of a lamp module 20 that may be used in the rearview mirror assembly of the present invention.
Figure 9:
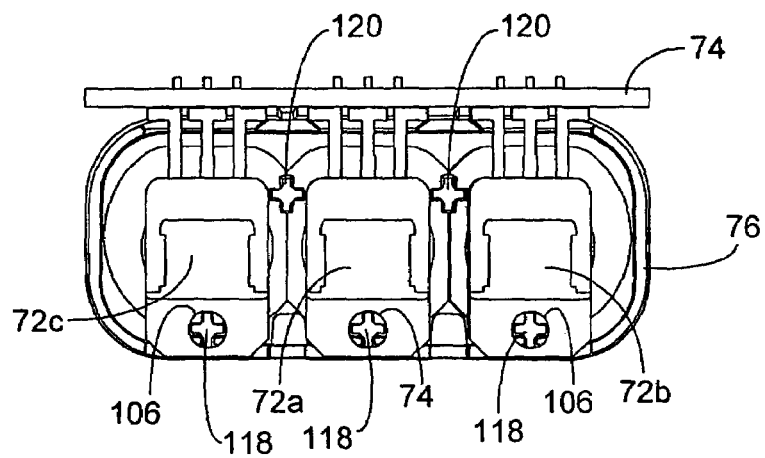
FIG. 9 is a rear elevated view of the partially assembled lamp module shown in FIG. 8.

A preferred LED device construction is shown in FIG. 7 and described generally below. The specifics of this construction are disclosed in commonly assigned U.S. patent application Ser. No. 10/078,906 entitled "RADIATION EMITTER DEVICE HAVING AN INTEGRAL MICRO-GROOVE LENS," on Feb. 19, 2002, by John K. Roberts, the entire disclosure of which is incorporated herein by reference. As generally shown, LED device 72 includes a lead frame structure including a plurality of leads 96 and a heat extraction member 98. As disclosed in commonly assigned U.S. Pat. No. 6,335,548 and in the above-mentioned commonly assigned U.S. patent application Ser. No. 09/723,675, the LED chips are mounted on heat extraction member 98 so as to be in thermal contact therewith. The heat extraction member 98 is operative to reduce the temperature of the LED device by providing a path of low thermal resistance between the LED chip junction and the ambient environment as described in U.S. Pat. No. 6,335,548 incorporated herein by reference.

The heat extraction member is partially covered by an encapsulant 100 that is transparent and includes a lens 102. Although the lens may have any conventional construction, it is preferred that lens 102 is a micro-groove lens having a plurality of small grooves 104 similar to a Fresnel lens. Light from the LED chips is generally emitted through lens 102, which serves to mix the light from the LED chips when LED chips of different colors are activated. One or more emitters (not shown) are mounted to the heat extraction member 98 under the lens, such attachment being made by bonding for example, and in particular a thermally conductive bonding material can be used. The electrical leads 96 preferably have a high thermal resistance. The electrical leads 96 are connected to the emitter, or emitters, and in particular, the illustrated three-lead LED device 72 has multiple emitters. Electrical connections are made with leads 96 so as to enable independent and variable activation of the LED chips. Those skilled in the art will recognize that the LED device 72 can have two leads, or more than three leads, and that the three-lead LED device is merely illustrative. In the illustrated example, where the LED device 72 has two LED chips, a first electrical lead can be connected to the anode of one LED chip and a second electrical lead can be connected to the anode of the other LED chip. The third electrical lead can be coupled to the cathode of both LED chips through the heat extraction member 98 as shown in FIG. 7. Such an arrangement permits application of respective control signals for the emitters. Each of the electrical leads 96 has a high thermal resistance relative to the heat extraction member, such that the leads can be assembled in a device using known production techniques, such as surface mounting, radial insertion, axial insertion, wave soldering, hand soldering, and/or other conventional manufacturing processes, even if substantial amounts of heat are applied to the leads during the process, without harming the LED device. All of the LED devices 72 may be of a similar construction, except as mentioned above, may have emitters to produce white light instead of red-orange light.

As discussed further below, heat extraction member 98 preferably includes an aperture 106, which is used to mechanically couple the LED devices and particularly heat extraction member 98 to a heat sink 82, or to other structures in the light module 20.

Although a particular LED device structure is illustrated in the drawings, it will be appreciated by those skilled in the art that any suitable LED device construction may be utilized. The particular LED device construction shown, however, is particularly advantageous due to its high power capabilities. Other forms of LED devices, such as those disclosed in commonly assigned U.S. Pat. No. 6,521,916 entitled "RADIATION EMITTER DEVICES AND METHOD OF MAKING THE SAME," filed on Apr. 13, 2001, by John K. Roberts et al., and in commonly assigned U.S. patent application Ser. No. 09/835,238 entitled "HIGH POWER RADIATION EMITTER DEVICE AND HEAT DISSIPATING PACKAGE FOR ELECTRONIC COMPONENTS," filed on Apr. 13, 2001, by John K. Roberts et al., the entire disclosures of which are incorporated herein by reference, may also be used.

Although the light module 20 construction shown in FIGS. 4-6 and discussed above is described as utilizing both LED devices 72*a* and 72*b* to emit white light toward the door handle or keyhole, this construction could be modified such that, for example, only LED device 72*b* emits white light towards the door handle whereas LED device 72*a* is configured to function as a turn signal light. In this case, it would be advantageous to reconfigure reflector 76 such that the light emitted from LED device 72*a* is directed away from the side of the vehicle and away from the eyes of the driver so as to not cause a distraction and inhibit the driver's ability to view the image reflected from the mirror 15. Nevertheless, it is also possible to configure both LED devices 72a and 72b to function both as a turn signal light and a door handle illuminator.

It is advantageous for the LED devices 72 to be packaged as a small lamp module 20 including circuit board 74 and a heat sink 82. The circuit board 74 can be of any suitable conventional type, although it is preferably a rigid circuit board. The circuit board 74 includes vias for receipt of leads 96. The leads 96 may be inserted into the vias by automated equipment, such as radial insertion equipment, and then soldered, by methods such as wave soldering. Those skilled in the art will recognize that other manufacturing techniques can be used, and that the described manufacturing techniques are merely exemplary.

The heat sink 82 can be of any suitable construction, and as will be described in greater detail hereinbelow, the heat sink can be active or passive. A passive heat sink 82, such as that illustrated in FIGS. 5, 8, 10, and 11, can be stamped from a metal or metal alloy, and preferably a metal alloy having a low thermal resistance and being light in weight. The heat sink can be manufactured from copper, brass, BeCu, aluminum, an aluminum alloy, or other metals or ceramics having good thermal conduction properties. Alternatively, active heat sinks can be employed, such as a Peltier cooler. The heat sink can be implemented using a phase change heat sink. It is also envisioned that in some applications, a fan could be provided to significantly increase heat dissipation.

As described in greater detail in the above-referenced U.S. Pat. No. 6,335,548, by providing improved thermal dissipation, the heat characteristics of the emitter, or emitters, producing the radiation emitted from the LED devices 72, are significantly improved. This is particularly advantageous in a signal mirror, as the ability to use a high power LED device 72 instead of incandescent lamps or a large array of LED devices enables implementation of a lighter turn signal lamp that does not consume a large volume within the mirror. High power LED devices are also advantageous in electrochromic mirrors even if there is room for a large turn signal lamp because brighter LED lamps permit a thicker transflective coating to be used, giving the window area of the mirror improved reflectance and sheet resistance, which can improve the performance of the mirror.

A variety of components and assemblies are described herein that improve the performance of LED devices. Although these components and assemblies can enhance the performance of any LED device, the LED devices 72 used are preferably high power LED devices. "High power LED device" as used herein is an LED package, without auxiliary components, wherein 90 percent of the LED power at peak light intensity is at least approximately 0.1 Watt. Additionally, any of the components and assemblies described herein can advantageously be implemented using an LED device having a heat extraction member. Particularly advantageous LED devices, according to which the LED devices herein are preferably manufactured, designed to optimize heat extraction and manufacturability into a component or assembly, are described in commonly assigned U.S. Pat. No. 6,335,548, the disclosure of which is incorporated herein by reference. These LED devices can be implemented using a semiconductor optical radiation emitter, such as an organic light emitter or a polymer light emitter, and in particular can include one, or more than one, emitter, and "LED device" as used herein includes any semiconductor optical radiation emitter package.

FIGS. 8-11 show a modified construction of lamp module 20 in that a third LED device 72c is included in the module. Third LED device 72c may be utilized for turn indication signaling, thus leaving two LED devices 72a and 72b to project light toward the side of the vehicle door.

Figure 10:
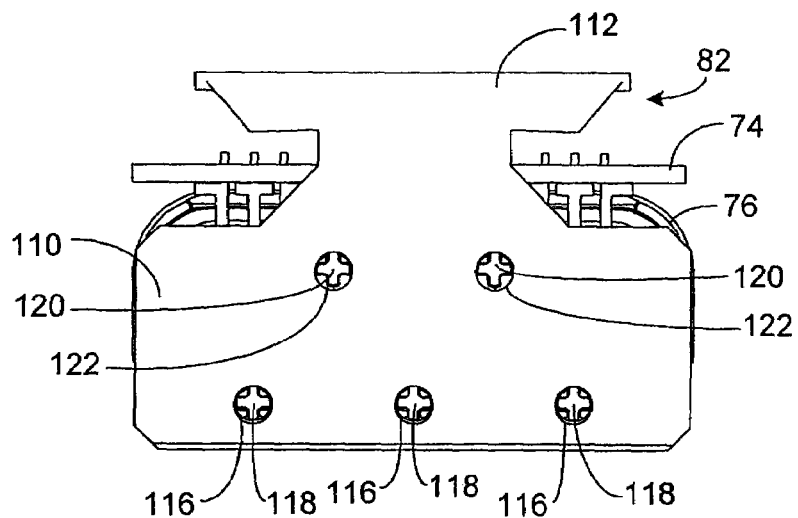
FIG. 10 is a rear elevated view of the partially assembled lamp module shown in FIG. 8
Figure 11:
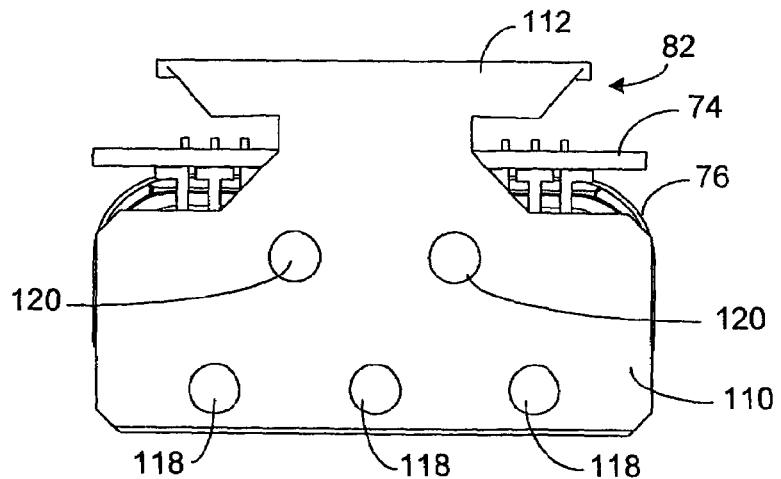
FIG. 11 is a rear elevational view showing the completed construction of the lamp module shown in FIG. 8.

As shown in FIGS. 5, 8, 10, and 11, heat sink 82 may be securely and thermally coupled to the heat extraction members 98 of LED devices 72. This facilitates the heat dissipation from the LED chips thereby allowing the LED chips to be driven at higher currents and thereby produce a greater light output. In a preferred construction, heat sink 82 includes an LED mounting portion 110 to which the LED devices 72 are mounted, and a perpendicular extension portion 112 that extends perpendicularly under circuit board 74 so as to conform to the inner surface of lamp module housing 36 (see FIG. 5). Portion 112 may include one or more apertures or other means 114 for securing heat sink 82 to the inner surface of lamp module housing 36. The LED mounting portion 110 preferably includes a first set of apertures 116 that align with the apertures 106 in the heat extraction members of LED devices 72. In this manner, reflector 76 may include heat stake posts 118, which align with and extend through apertures 106 and 116. Posts 118 are configured to have a length sufficient to extend entirely through apertures 116 and past the rear surface of heat sink 82. Reflector 76 may also include a second set of heat stake posts 120 that extend between LED devices 72 and through a second set of apertures 122 formed in LED mounting portion 110 of heat sink 82. As shown in FIGS. 10 and 11, heat stake posts 118 and 120 may subsequently be thermally deformed and thereby securely fasten the reflector to the LED devices and to the heat sink.

Alternatively, the LED devices 72 can be attached to the heat sink 82 using a thermally conductive adhesive, an adhesive tape, or any other suitable conventional coupling means providing a thermal path from the heat extraction member of the LED devices 72 to the heat sink 82.

In addition, as shown in FIG. 5, an aperture may be formed in lamp module housing 36. The heat stake posts may then be configured to be sufficiently long to extend through the housing 36 as well and thereby secure all the aforementioned components of the lamp module 20 within housing 36 in one easy process. As also shown in FIG. 5, lamp module housing 36 may be configured to snap-fit or otherwise engage with carrier plate 30. Lamp module housing 36 may be composed of plastic or metal, but is preferably sufficiently lightweight so as to not cause excessive vibrational concerns. If housing 36 is made of metal, it can serve as the heat sink for the LED devices and thus allow the integration of the heat sink 82 with lamp module housing 36. In this case, the heat stakes may extend through holes provided in the housing 36 such that the lamp module 20 may be attached directly to housing 36. Alternatively, a separate heat sink 82 may still be employed but thermally coupled to the metal housing 36 so as to improve the heat sinking capacity.

Configurations for fitting such a lamp module housing 36 to a carrier plate 30 are disclosed in commonly assigned U.S. patent application Ser. No. 09/862,414 entitled "REARVIEW MIRROR CONSTRUCTED FOR EFFICIENT ASSEMBLY," filed on May 21, 2001, by Bradley L. Busscher et al., the entire disclosure of which is incorporated herein by reference.

By providing an interfitting relation between the carrier plate and the lamp module housing 36, proper registration of the lamp module with transparent portions of the mirror may be ensured. Specifically, bezel 38, which extends around the periphery of mirror 15, engages with the outer edges of carrier plate 30 to thereby ensure registration of the carrier plate, and hence the light module with mirror 15. Mirror 15 may have various constructions as mentioned above. In any event, at least the portion of the reflector layer in front of the LED devices of the light module must be at least partially transparent to allow the light from the LED devices to pass through mirror 15. One method is to etch the reflector layer in its entirety from the region in front of the LED devices. As described below, another technique is to etch only portions of the area in front of the LED devices while leaving some reflective strips or other pattern in front of the LED devices so as to provide some reflectivity and obscure the ability to see the signal lamp behind the mirror. Yet another technique is to form the reflector or at least the portion thereof in front of the LED devices as a partially transmissive, partially transflective layer. The latter two techniques discussed above are disclosed in commonly assigned U.S. Pat. No. 6,356,376. Yet another technique is to form the reflector layer as a dichroic coating that is configured to allow maximum transmission at the wavelengths of light that need to be transmitted. While this would be very difficult when using an incandescent white light, it may be possible when using a binary complementary pair of LED chips or other narrow band light sources by configuring the dichroic layer to allow transmission of the two wavelengths of light that mix to form white light.

Figure 12:
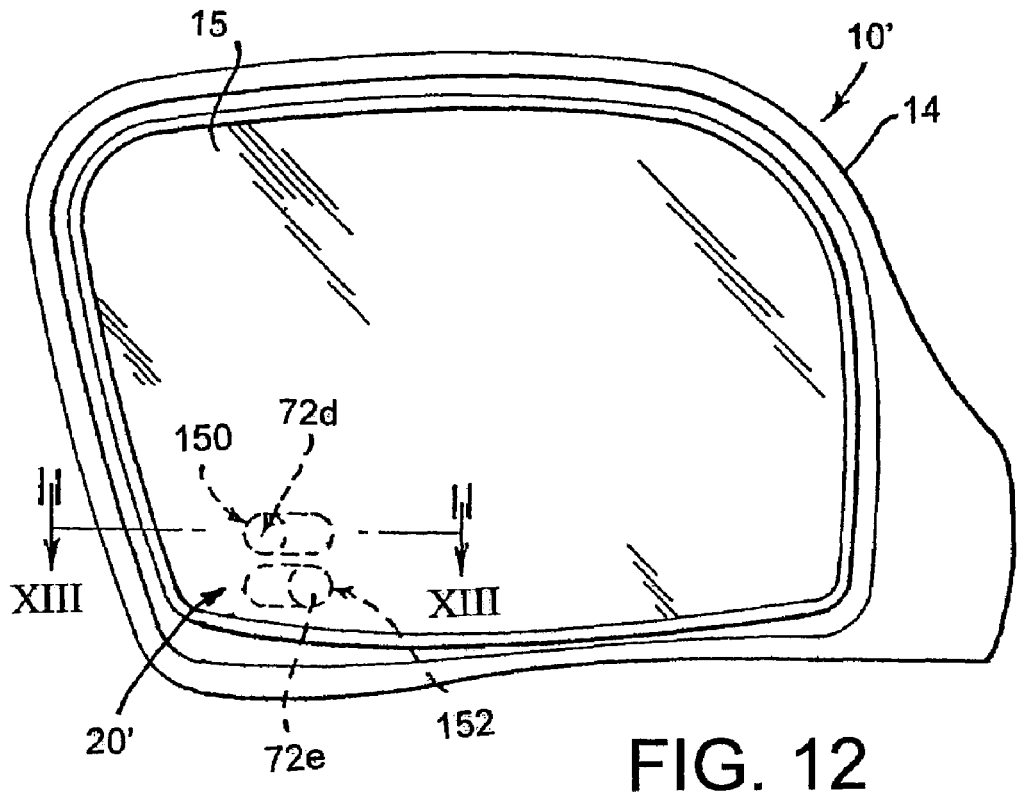
FIG. 12 is a perspective view of a rearview mirror assembly constructed in accordance with a second embodiment of the present invention.
Figure 13:
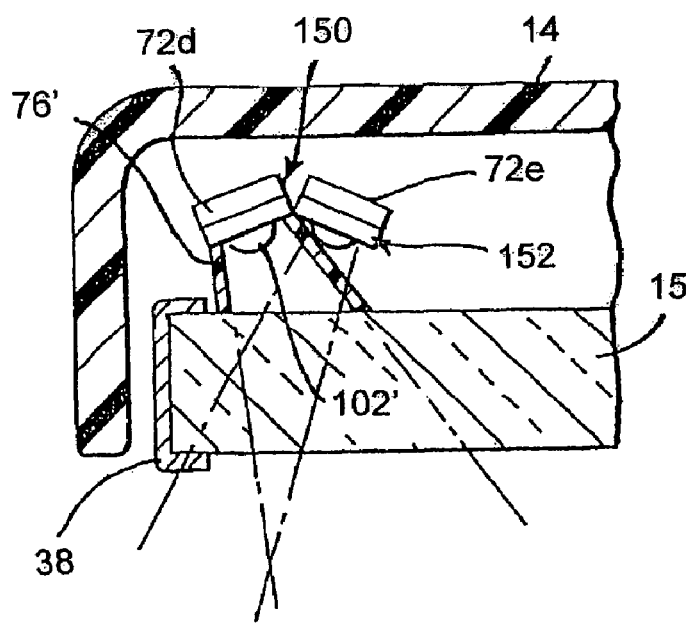
FIG. 13 is a partial cross-sectional view taken along line XIII-XIII in FIG. 12.

FIGS. 12 and 13 show a mirror assembly 10' constructed in accordance with a second embodiment of the present invention. Mirror assembly 10' includes a door handle/keyhole illuminator 150 and a turn signal light 152. The keyhole illuminator includes a high power LED device 72$d$ positioned behind mirror 15 that produces light to illuminate the door handle 16 and the keyhole 18 (FIG. 2), or alternatively produces light directed toward the ground to effect a puddle lamp. The LED device 72$d$ may include one or multiple emitters (not shown) under an encapsulant lens 102'. The LED device preferably produces white light, and thus includes one or more phosphor emitters, binary complementary colored emitters, or red-green-blue emitters, which are energized so as to produce white light.

Lens 102' of the LED device 72$d$ is preferably of a relatively small diameter to produce a focused light that can be targeted on an area to be illuminated. Alternatively, if the lamp is used to produce puddle light illumination, the lens will have a larger diameter producing a significantly less focused light. The keyhole illuminator may turn ON responsive to a signal from a proximity detector, a remote keyless entry receiver, manual actuation of the door handle, turning the vehicle off, or the like, and it can turn OFF automatically after a predetermined time period has elapsed, when the vehicle is turned ON, or once the door is closed.

The keyhole illuminator is preferably provided with a reflector 76' to concentrate the light produced by LED device 72$d$ on the side of the door around the door handle 16 and the keyhole 18. The reflector may be implemented using any suitable conventional construction, such as a conventional flashlight reflector construction, or the inside surface of the reflector can be provided by applying a highly reflective coating, such as chrome, to the inside surface of a rigid body, such as a molded organic polymer body, or of any other suitable construction. The reflector is held against the LED device 72$d$ by any suitable means, such as using an adhesive, a fastener, snap-fit connection, compression fit between the mirror 15 and the LED device 72$d$, or the like. The reflector 76' preferably circumscribes the lens 102'.

A second LED device 72$e$, if the mirror is to be a signal mirror, can be implemented as described above with respect to FIGS. 12 and 13. The LED devices 72$d$ and 72$e$ are small in size, such that two LED devices can be accommodated between the mirror 15 and the mirror housing body 14. Each of the LED devices preferably includes a heat extraction member to increase the heat dissipation from the LED chip(s) and thus increase the current capacity, and output intensity, of the LED devices, as described above.

Figure 14:
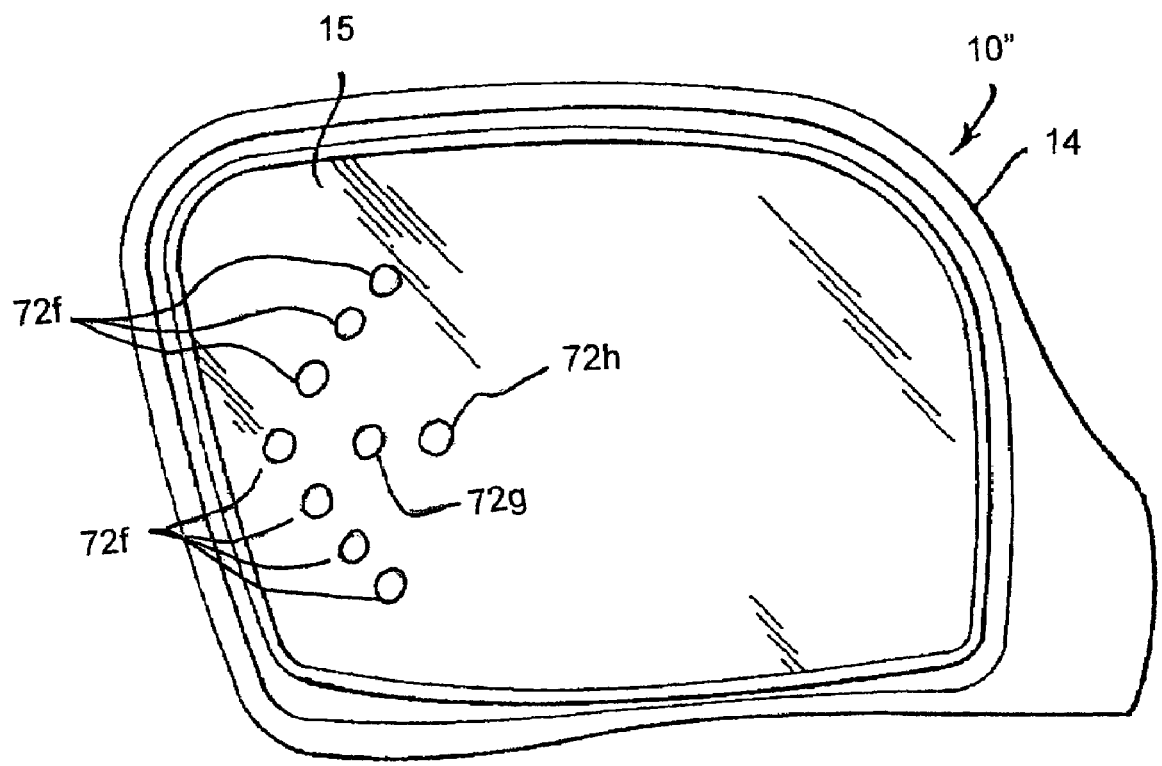
FIG. 14 is a perspective view of a rearview mirror assembly constructed in accordance with a third embodiment of the present invention.

FIG. 14 shows a rearview mirror assembly 10" constructed in accordance with a third embodiment of the present invention. In this embodiment, a turn signal indicator is provided behind mirror 15. The turn signal indicator includes a plurality of light sources 72$f$ arranged in the shape of a chevron. A light source 72$g$ is provided to project light at an angle downward through mirror 15 towards the ground proximate the side of the vehicle around the vehicle doors. Another light source 72$h$ is provided to illuminate the door handle/key hole on the vehicle door in the manner discussed above. Both light sources 72$g$ and 72$h$ preferably include at least one LED device that emits white illumination. Either or both of light sources 72$g$ and 72$h$ may also serve as a blindspot indicator in the manner discussed above. As described further below, light sources 72$g$ and 72$h$ also preferably function as part of the turn signal indicator in conjunction with light sources 72$f$.

Light sources 72$f$ are preferably arranged in a chevron shape in order to provide a more uniform signal than would otherwise be provided utilizing a single light source alone. The LED devices constituting light sources 72$g$ and 72$h$ preferably include at least one amber LED chip and at least one blue-green LED chip whose light emissions mix to form white illumination in the manner disclosed in U.S. Pat. No. 5,803,579 entitled "ILLUMINATOR ASSEMBLY INCORPORATING LIGHT EMITTING DIODES," the entire disclosure of which is incorporated herein by reference. To configure light sources 72$g$ and 72$h$ to function as a portion of the turn signal indicator, a control circuit 44 may be provided that is responsive to a turn signal activation to activate only the amber LED chips within the LED devices of light sources 72$g$ and 72$h$ in conjunction with the LED devices forming light sources 72$f$. To provide uniform coloration, light sources 72$f$ preferably include amber LED chips/devices. Alternatively, red or red/orange LED chips may be included in the LED devices forming light sources 72$g$ and 72$h$ and light sources 72$f$ may be constructed using corresponding red or red/orange LED chips.

The circuit controlling activation of light sources 72$f$, 72$g$, and 72$h$ during turn signal indication may either simultaneously blink all of light sources 72$f$, 72$g$, and 72$h$ or may activate these light sources in a sequential order. For example, the circuit may first activate the amber or red LED chip in light source 72$h$ followed by the activation of an amber or red LED chip in light source 72$g$, and then activate all of the LED devices forming light sources 72$f$. The amber or red LED chip in light sources 72$h$ and 72$g$ may remain activated during such time that the subsequent LED chips/devices are activated and then all of the light sources may be deactivated at once, or alternatively, light source 72$h$ may be extinguished first followed by light source 72$g$. Moreover, light source 72$h$ may be activated and deactivated before light source 72$g$ is activated. Likewise, light source 72$g$ may be extinguished before light sources 72$f$ are activated. Once all three sets of light sources have been illuminated the sequence may be repeated until the turn signal actuator is disengaged.

Another option for activating light sources 72$f$, 72$g$, and 72$h$ is to sequentially increase the brightness of the illuminated light sources. For example, light source 72$g$ could be activated with greater current levels to provide a brighter output than light source 72$h$ and light sources 72$f$, in turn, could be driven at greater current levels to further increase the brightness when those light sources are activated.

Each of the light sources 72$f$, 72$g$, and 72$h$ are preferably formed of LED devices constructed in accordance with commonly assigned U.S. Pat. No. 6,335,548 entitled "SEMICONDUCTOR RADIATION EMITTER PACKAGE," the entire disclosure of which is incorporated herein by reference.

Figure 15:
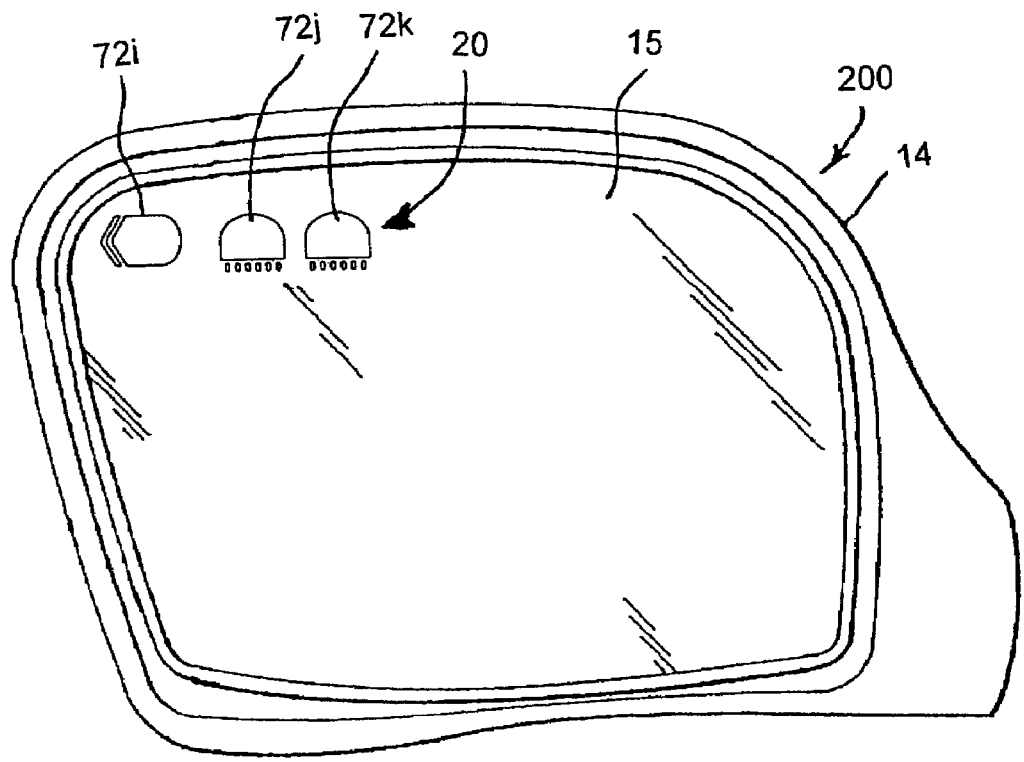
FIG. 15 is a perspective view of a rearview mirror assembly constructed in accordance with a fourth embodiment of the present invention.

FIG. 15 shows a rearview mirror assembly 100 constructed in accordance with a fourth embodiment of the present invention. Mirror assembly 200 includes a first light source 72$i$, a second light source 72$j$, and a third light source 72$k$ arranged in a linear array behind mirror element 15. Each of light sources 72$i$, 72$j$, and 72$k$ may be used for turn signal indication, security illumination, and/or blind spot indication. As described above with respect to the embodiment shown in FIG. 14, the light sources 72$i$, 72$j$, and 72$k$ may be activated sequentially during a turn signal lighting mode beginning with light source 72$k$. Light sources 72$j$ and 72$k$ may be activated in a security lighting mode for illuminated approach/entry such as illuminating the ground proximate the vehicle door, illuminating the door handle and keyhole, or both the ground and the door. In addition, light sources 72$j$ and 72$k$ may be activated during a blind spot indication mode to indicate whether the blind spot detector is operational and whether an object is detected in the vehicle's blind spots.

Light sources 72$j$ and 72$k$ preferably emit: effective white light during the security lighting mode; amber, orange, red, or red-orange during a turn signal lighting mode; and red, green, amber, and/or yellow light during a blind spot indication mode. The construction of the lamp module 20 used in this embodiment, may be similar to that shown in FIGS. 4, 5, and 8-11.

Although lamp module 20 is shown in FIG. 15 as being positioned behind the top outer corner of mirror 15, module 20 may alternatively be placed in the bottom outer corner or in any other location behind mirror 15. Further, the lamp module positioned may be in or on the housing 14.

Figure 16:
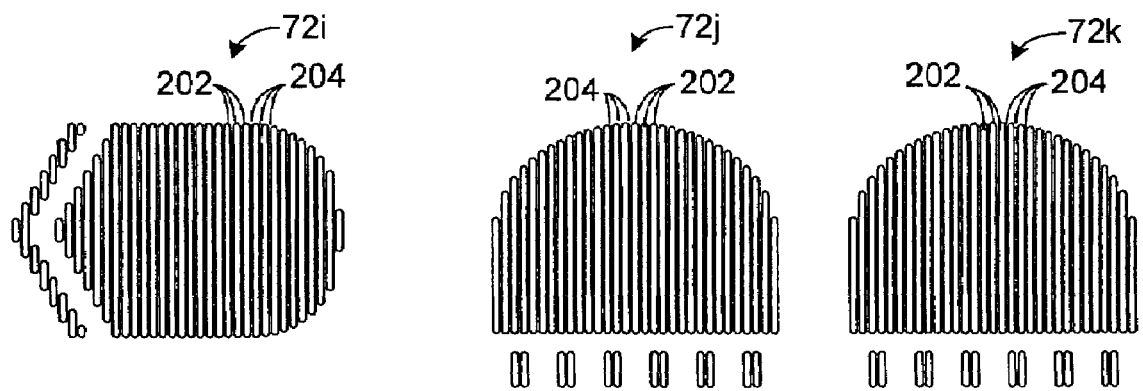
FIG. 16 is an enlarged view of the display area of the mirror shown in FIG. 15.

FIG. 16 is an enlarged view of the display area of the mirror shown in FIG. 15. As shown, each of the display areas in front of the light sources 72$i$, 72$j$, and 72$k$ include a plurality of strips 202 of zones that are devoid of reflective material and a plurality of strips 204 of reflective material. Such a construction provides some reflectivity in the display areas while maintaining electrical continuity through most of the display area as would be desirable when the mirror element is constructed with a third surface reflector/electrode.

Although the above embodiments are described and shown as having light sources positioned in specific locations behind a mirror element in the mirror assembly, it will be appreciated that the light sources may be positioned in various locations behind the mirror element or may be located on or adjacent the housing of the rearview mirror assembly such that the light emitted therefrom would not project through the mirror element. Additionally, some of the light sources may be positioned on or within the housing while other ones of the light sources may be positioned behind the mirror element.

As noted above, an electrical circuit board may be provided in the rearview mirror assembly. The electrical circuit board may comprise light module 20, an information display, an antenna, a transceiver, a reflective element control, an outside mirror communication system, a remote keyless entry system, proximity sensors, and interfaces for other apparatus described herein. U.S. Pat. Nos. 6,244,716, 6,523,976, 6,521,916, 6,441,943, 6,335,548, 6,132,072, 5,803,579, 6,229,435, 6,504,142, 6,402,328, 6,379,013, and 6,359,274 disclose various electrical components and electrical circuit boards that may be employed in one or more embodiments, the disclosures of each of these U.S. patents are incorporated herein in their entireties by reference.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A rearview mirror assembly for a vehicle comprising:
a housing configured for attachment to the vehicle;
a mirror positioned in said housing;
a turn signal light source; and
a door illuminator light source configured to project light towards the door handle and/or locking mechanism of the vehicle, wherein said door illuminator light source is disposed behind said mirror so as to project light through said mirror.

2. The rearview mirror assembly of claim 1, wherein said mirror is an electrochromic mirror.

3. The rearview mirror assembly of claim 1, wherein said light sources comprise at least one LED device.

4. The rearview mirror assembly of claim 1 and further comprising a blind spot indicator light source for indicating when an object is detected in a blind spot of the vehicle.

5. The rearview mirror assembly of claim 1, wherein said door illuminator light source is further configured to function as a blind spot indicator light source for indicating when an object is detected in a blind spot of the vehicle.

6. The rearview mirror assembly of claim 1, wherein at least one of said light sources is disposed behind said mirror so as to project light through said mirror.

7. The rearview mirror assembly of claim 1, wherein said turn signal light source and said door illuminator light source are mounted in a common lamp module.

8. The rearview mirror assembly of claim 1, wherein said door illuminator light source is activated during both a door illumination lighting mode and a turn signal lighting mode.

9. The rearview mirror assembly of claim 8, wherein said turn signal light source and said door illuminator light source are coupled to a control circuit for receiving activation signals therefrom.

10. The rearview mirror assembly of claim 9 and further comprising a second door illuminator light source coupled to the control circuit, wherein the control circuit sequentially activates said door illuminator light sources and said turn signal light source during a turn signal lighting mode.

11. A light module for a vehicle rearview mirror assembly, said light module comprising:
a turn signal light source;
a door illuminator light source configured to project light at a portion of a door of the vehicle; and
a reflector having at least two reflector cups, wherein said turn signal light source and said door illuminator light source each comprise at least one LED device, and wherein each LED device is associated with one of said reflector cups.

12. The light module of claim 11, wherein said door illuminator light source emits effective white light and said turn signal light source emits light of a color selected from the group consisting of: amber, red, orange, and red-orange.

13. A rearview mirror assembly for a vehicle comprising:
a housing configured for attachment to the vehicle;
a mirror positioned in said housing;

a turn signal light;
a door illuminator light configured to project light at a portion of a door of the vehicle, wherein said door illuminator light source is disposed behind said mirror so as to project light through said mirror; and
a blind spot indicator light for indicating when an object is detected in a blind spot of the vehicle.

14. The rearview mirror assembly of claim 13, wherein said door illuminator light includes at least one LED device for emitting effective white light.

15. The rearview mirror assembly of claim 14, wherein said at least one LED device includes a plurality of differently colored LED chips, and wherein at least one of said LED chips is selectively energized to function as said blind spot indicator light.

16. The rearview mirror assembly of claim 15, wherein said at least one LED device includes an LED chip that emits red light when activated to provide a warning of an object in the vehicle's blind spot.

17. The rearview mirror assembly of claim 13, wherein said at least one LED device includes a first LED chip that emits amber light when activated to provide an indication that a blind spot detection system to which the LED device is coupled is operational.

18. The rearview mirror assembly of claim 17, wherein said at least one LED device further includes a second LED chip that emits blue-green light, when said first and second LED chips are simultaneously activated the LED chips emit light that mixes and forms effective white light illumination that is projected towards a door handle of the vehicle.

19. The rearview mirror assembly of claim 13, wherein said at least one LED device includes a first LED chip that emits blue-green light when activated to provide an indication that a blind spot detection system to which the LED device is coupled is operational.

20. The rearview mirror assembly of claim 13, wherein said lights are provided in a common light module.

21. The rearview mirror assembly of claim 13, wherein at least one of said lights is positioned behind said mirror so as to project light through said mirror.

22. A mirror subassembly for a vehicle comprising:
a mirror element; and
a turn signal indicator mounted behind said mirror element, said turn signal indicator comprising a first light source, a second light source, and a third light source, wherein said first, second, and third light sources are sequentially activated.

23. The mirror subassembly of claim 22, wherein said first light source is activated and then deactivated prior to activation of said second light source, and wherein said second light source is activated and then deactivated prior to activation of said third light source.

24. The mirror subassembly of claim 23, wherein said third light source is deactivated shortly after it is activated and then the lighting sequence repeats with said first light source being activated.

25. The mirror subassembly of claim 22, wherein said first light source is activated and then said second light source is activated and then said third light source is activated, subsequently said first light source is deactivated and then said second light source is deactivated and then said third light source is deactivated at which time the activation/deactivation sequence repeats.

26. A rearview mirror assembly for a vehicle comprising:
a mirror housing for mounting to the vehicle;
a mirror element disposed in said mirror housing; and
a turn signal indicator disposed in said mirror housing, said turn signal indicator comprising a first light source, a second light source, and a third light source, wherein said first, second, and third light sources are sequentially activated.

27. The mirror assembly of claim 26, wherein said first light source is activated and then deactivated prior to activation of said second light source, and wherein said second light source is activated and then deactivated prior to activation of said third light source.

28. The mirror assembly of claim 27, wherein said third light source is deactivated shortly after it is activated and then the lighting sequence repeats with said first light source being activated.

29. The mirror assembly of claim 26, wherein said first light source is activated and then said second light source is activated and then said third light source is activated, subsequently said first light source is deactivated and then said second light source is deactivated and then said third light source is deactivated at which time the activation/deactivation sequence repeats.

30. An exterior rearview mirror assembly for a vehicle comprising:
a mirror housing for mounting to the exterior of a vehicle;
a mirror element disposed in said mirror housing; and
a first light source disposed proximate said mirror element, said first light source being operable in a first lighting mode in response to a first activation signal, and in a second lighting mode in response to a second activation signal.

31. The mirror assembly of claim 30, wherein the first light mode includes one of a turn signal indication mode, a security illumination mode, and a blind spot indication mode.

32. The mirror assembly of claim 30 and further comprising a second light source disposed proximate said mirror element, wherein said second light source is operable in one of a turn signal indication mode, a security illumination mode, and a blind spot indication mode.

33. The mirror assembly of claim 32 and further comprising a third light source, wherein said first, second, and third light sources are sequentially activated.

34. The mirror assembly of claim 30, wherein said first light source includes an LED device that emits light of at least two different colors selectable for the first and second lighting modes.

35. The mirror assembly of claim 30 and further comprising a control circuit for generating the first and second activation signals to control the lighting mode of said first light source.

36. The mirror assembly of claim 30 and further comprising a deviator for redirecting a portion of the light emitted from said first light source towards the eyes of the driver of the vehicle.

37. The mirror assembly of claim 30 and further comprising a reflector disposed relative to said first light source to direct light emitted from said light source in a desired direction, said deviator being a facet in said reflector.

38. The mirror assembly of claim 30, wherein said first light source emits amber light during a turn signal mode.

39. The mirror assembly of claim 30 and further comprising a heat sink, wherein said first light source includes an LED device having a heat extraction member that is thermally coupled to said heat sink.

40. The mirror assembly of claim 39, wherein said heat extraction member is physically coupled to said heat sink by a heat stake.

41. A rearview mirror subassembly for a vehicle comprising:
  a mirror;
  a turn signal light; and
  a blind spot indicator light for indicating when an object is detected in a blind spot of the vehicle, wherein said turn signal light and said blind spot indicator light are positioned behind said mirror so as to project light through said mirror.

* * * * *